United States Patent [19]
Davis et al.

[11] Patent Number: 5,174,796
[45] Date of Patent: Dec. 29, 1992

[54] PROCESS FOR THE PURIFICATION OF NATURAL GAS

[75] Inventors: Mark M. Davis, Bronxville, N.Y.; Robert L. Gray, Jr., Bridgewater, Conn.; Kirit Patel, Hopewell Junction, N.Y.

[73] Assignee: UOP, Des Plaines, Ill.

[21] Appl. No.: 774,020

[22] Filed: Oct. 9, 1991

[51] Int. Cl.$^5$ .............................................. B01D 53/04
[52] U.S. Cl. ........................................ 55/26; 55/62; 55/68; 55/74
[58] Field of Search ................... 55/25, 26, 31, 33, 58, 55/62, 68, 74, 75

[56] References Cited

U.S. PATENT DOCUMENTS

| | | | |
|---|---|---|---|
| 3,564,816 | 2/1971 | Batta | 55/26 |
| 4,077,780 | 3/1978 | Doshi | 55/26 |
| 4,475,929 | 10/1984 | Fuderer | 55/62 X |
| 4,726,816 | 2/1988 | Fuderer | 55/26 |
| 4,761,165 | 8/1988 | Stöcker et al. | 55/26 X |
| 4,775,394 | 10/1988 | Yamano et al. | 55/26 |
| 4,834,780 | 5/1989 | Benkmann | 55/26 |
| 4,857,083 | 8/1989 | DiMartino | 55/26 |
| 5,013,334 | 5/1991 | Maurer | 55/26 |
| 5,015,272 | 5/1991 | Okada et al. | 55/26 |
| 5,026,406 | 6/1991 | Kumar | 55/26 |

Primary Examiner—Robert Spitzer
Attorney, Agent, or Firm—Thomas K. McBride; John G. Tolomei; Richard P. Silverman

[57] ABSTRACT

A process is provided for the purification of natural gas wherein the nitrogen content of natural gas is reduced to pipeline specification using a pressure swing adsorption processes with a suitable selective adsorbent for methane purification. More specifically, the present invention relates to the use of a particular combination of steps in the PSA cycle to produce a product natural gas having a reduced nitrogen content, a nitrogen-rich stream and a high heat content fuel gas stream.

24 Claims, 7 Drawing Sheets

PROCESS FOR THE PURIFICATION OF NATURAL GAS

FIELD OF THE INVENTION

The present invention relates to processes for the purification of natural gas. Particularly, the present invention relates to the reduction of the nitrogen content of a natural gas stream using a pressure swing adsorption processes for methane purification. More specifically, the present invention relates to the use of a particular combination of steps in the PSA cycle to produce a product natural gas having a reduced nitrogen content, a nitrogen-rich stream, and a high heat content stream for fuel use.

BACKGROUND OF THE INVENTION

Pressure swing adsorption (PSA) provides an efficient and economical means for separating a multi-component gas stream containing at least two gases having different adsorption characteristics. The more strongly adsorbable gas can be an impurity which is removed from the less strongly adsorbable gas which is taken off as product; or, the more strongly adsorbable gas can be the desired product, which is separated from the less strongly adsorbable gas. For example, in the latter case it may be desired to reduce the concentration of nitrogen and other inert materials in a natural gas stream, comprising methane, ethane, nitrogen, carbon dioxide and $C_3+$ hydrocarbons, to improve the heat content of the product gas. This reduction of inerts is often requried to meet the quality specifications of pipeline companies who transport natural gas from a well head or natural gas processing plant to the consumer. Typically the natural gas must meet the following specifications:

| Heat Content | 900 to 1000 BTU |
| --- | --- |
| Total Inerts ($N_2 + CO_2$) | 7% maximum |
| Nitrogen | 3% maximum |

Actual pipeline specifications vary somewhat depending upon the producer's contract for price and quality. In general, a specification for a higher heating value requires a lower amount of inerts such as nitrogen and carbon dioxide. Typically, natural gas at the well head can contain between 3 and 60 mol. % nitrogen, between 0.1 and 10 mol. % ethane, between 0.1 and 20 mol. % $C_3+$ hydrocarbons and between 0.1 and 20 mol. % $CO_2$. Inerts of which nitrogen is typically the major component, must be removed from natural gas to improve the heat content of the gas and to meet pipeline specification.

In pressure swing adsorption, a multi component gas is typically fed to at least one of a plurality of adsorption zones at an elevated pressure effective to adsorb at least one component, while at least one other component passes through. At a defined time, the passage of the feedstream to the adsorber is terminated and the adsorption zone is depressurized by one or more cocurrent depressurization steps wherein pressure is reduced to a defined level which permits the separated, less strongly adsorbed component or components remaining in the adsorption zone to be drawn off without significant concentration of the more strongly adsorbed components. Then, the adsorption zone is depressurized by a countercurrent depressurization step wherein the pressure on the adsorption zone is further reduced by withdrawing desorbed gas countercurrently to the direction of feedstream. Finally, the adsorption zone is purged and repressurized. The final stage of repressurization is typically with product gas and is often referred to as product repressurization.

In multi-zone systems there are typically additional steps, and those noted above may be done in stages. U.S. Pat. Nos. 3,176,444 issued to Kiyonaga, 3,986,849 issued to Fuderer et al., and 3,430,418 and 3,703,068 both issued to Wagner, among others, describe multi-zone, adiabatic pressure swing adsorption systems employing both cocurrent and countercurrent depressurization, and the disclosures of these patents are incorporated herein by reference in their entireties.

Various classes of adsorbents are known to be suitable for use in PSA systems, the selection of which is dependent upon the feedstream components and other factors generally known to those skilled in the art. In general, suitable adsorbents include molecular sieves, silica gel, activated carbon and activated alumina. The preferred adsorbent for a typical operation of the invention is activated carbon.

The applications for this technology are mostly in small natural gas plants of capacity of from 1 to 30 MMSCF/D. In these natural gas plants there are generally two product streams: natural gas liquids and compressed natural gas. The compressed natural gas comprising methane is returned to a pipeline and sold commercially.

In a typical natural gas plant wherein liquid hydrocarbons are recovered from the natural gas, the scheme consists of an inlet separator, a refrigerated flash zone, inlet gas and a stabilizer and recovery section. The inlet gas passes through an inlet separator and is cross-exchanged with the cold gas coming out of the system to reduce the temperature of the inlet gas. The cold gas is passed to a gas chiller wherein the gas reaches its minimum temperature. This minimum temperature generally ranges from 15° F. to −40° F. From the chiller the gas is passed to a cold separator to recover the sales gas and liquids. The liquids are recycled through a stabilization column wherein light material is removed to maintain a vapor pressure specifications. The overhead from the stabilization column is combined with the sale gas which is recompressed to pipeline pressures and returned to the pipeline. This sales gas is the feed to be processed in the instant process.

In a typical refrigeration system, the liquid product recovered comprises a portion of the $C_4$ and heavier materials that are in the gas. Other light components, such as ethane and propane are not removed from the sales gas in this type of plant.

A second typical configuration for natural gas plants uses a turbo expander to reach cryogenic conditions for the recovery of the liquids from the natural gas. The inlet gas enters through an inlet separator and is cross-exchanged with the cold sales gas leaving the system. In this step, the temperature of the inlet gas is reduced to about −45° F. The cold gas is passed through a turbo expander where it undergoes an isentropic expansion wherein it provides some energy recovery in a turbine. This expansion step reduces the temperature of the inlet gas to about −135° F., depending on the operation of the system. The chilled gas is passed to a stabilization column and a liquids recovery system. In a plant with a turbo expander the recovery of ethane is significantly improved resulting in a sales gas which contains less than 1% of ethane and heavier hydrocarbons. The sales gas still contains a significant portion of inerts that have been carried through the system. Treatment of the sales gas to remove the inerts is often required to meet pipelines specifications before the sales gas is returned to the pipeline.

Another option for removing inert material from natural gas is to treat the raw natural gas at the wellhead before it reaches the pipeline or the natural gas plant. In some cases where the plant handles 15 MMSCFD comprising feed from 20 to 30 different wells, only some of the gas may contain significant amounts of nitrogen. Rather than construct a single large unit to remove nitrogen in the natural gas plant, it may be more economical to provide a smaller treatment facility to remove inerts from those particular wells where the inert concentration is highest. If the particular wells with the greatest amount of nitrogen amount to 25 to 40% of the total feed, this approach can result in significant operation cost savings by reducing the volume of gas required to be recompressed following the inert removal process.

The pressure history of the natural gas from the well head can provide a number of opportunities for the placement of this technology for maximum economic benefit. The movement of natural gas to the gas plant is accomplished by the compression at the well head to a pressure of 100-200 psia in order to gather the gas and send the gas to the natural gas plant. If the natural gas could be provided at a pressure of at least 100 psia, there would be sufficient pressure differential to operate the nitrogen removal process of this invention. More typically, the entire feed gas is supplied at a pressure range of from 220-250 psia, but this pressure is often reduced to 150 psia before it reaches the nitrogen removal process at the natural gas plant. Thus, if the gas could be treated before it reaches the natural gas plant at a lower pressure, there could be additional compression savings.

There are two approaches available in using a PSA process for the removal of nitrogen from natural gas. One approach employs a rate selective separation wherein the process takes advantage of the smaller kinetic diameter of nitrogen compared to methane to selectively adsorb the nitrogen into a molecular sieve, particularly a carbon molecular sieve. A number of U.S. patents (U.S. Pat. Nos. 4,578,089 and 4,376,640) claim the use of this approach for natural gas and air separation. The process of the current invention uses an equilibrium selective separation wherein methane adsorption is favored over nitrogen.

DESCRIPTION OF THE PRIOR ART

The U.S. patent to Richter et al. (U.S. Pat. No. 4,578,089) employes a pressure swing adsorption process for the separation of a strongly adsorbable gas, such as methane, from a less readily adsorbable gas such as nitrogen in a gas mixture over a carbon-containing adsorbent such as active carbon. The process uses part of the gas produced for purging in the PSA process. The adsorbed gas is recovered in concentration of 99.5% by volume.

The U.S. patent to Fuderer (U.S. Pat. No. 4,723,966) describes a PSA process for the separation of gas streams using a cocurrent depressurization step and a step which depressurizes the adsorber bed from both of the ends simultaneously to achieve a binary gas purification in a single PSA adsorber bed.

The carrying out of the PSA process in multi-bed systems is illustrated by the Wagner patent, U.S. Pat. No. 3,430,418, relating to a system having at least four beds. As is generally known and described in this patent, the PSA process is commonly performed in a cycle of a processing sequence that includes in each bed: (1) higher pressure adsorption with release of product effluent from the product end of the bed; (2) cocurrent depressurization to intermediate pressure with release of void space gas from the product end thereof; (3) countercurrent depressurization to a lower desorption pressure; (4) purge; and (5) repressurization. The void space gas released during the cocurrent depressurization step is commonly employed for pressure equalization purposes and to provide purge gas to a bed at its lower desorption pressure.

Similar systems are known which utilize 3 beds for separations. See, for example U.S. Pat. No. 3,738,087 to McCombs. The faster the beds perform steps 1 to 5 to complete a cycle, the smaller the beds can be when used to handle a given hourly feed gas flow. If two steps are performed simultaneously, the number of beds can be reduced or the speed of cycling increased, thus, reduced costs are obtainable.

U.S. Pat. No. 4,589,888 to Hiscock et al. discloses that reduced cycle times are achieved by an advantageous combination of specific simultaneous processing steps. The gas released upon cocurrent depressurization from higher adsorption pressure is employed simultaneously for pressure equalization and purge purposes. Cocurrent depressurization is also performed at an intermediate pressure level, while countercurrent depressurization is simultaneously performed at the opposite end of the bed being depressurized.

U.S. Pat. No. 4,512,780 to Fuderer discloses a pressure swing adsorption process with intermediate product recovery. These products are recovered from a pressure swing adsorption process utilizing a displacement step in conjunction with pressure equalization between beds of a multi-bed adsorption system.

An article titled, "*A New Composite Sorbent for Methane-Nitrogen Separation by Adsorption,*" by M.S.A. Baksh, A. Kapoor and R. T. Yang, which appeared in *Separation Science and Technology*, 25(7 & 8), pp. 845-868, 1990 described the application of composite sorbents to a process for the separation of methane and nitrogen from a mixture thereof. A PSA cycle was described by computer simulation which achieved a 73% recovery of 90% purity methane gas.

SUMMARY OF THE INVENTION

By the present invention, a PSA process is provided for natural gas purification that can reduce the content of nitrogen in the natural gas at the well head or within a natural gas processing plant. More specifically, the present invention relates to the use of a particular combination of steps in the PSA cycle to produce a product natural gas having a reduced nitrogen content, a nitrogen-rich stream, and a high heat content stream for fuel use. This process achieves the removal of nitrogen and further provides a means for upgrading a portion of the rejected gas for use as a fuel. The process of this invention provides an economic means for rejecting a portion of the inerts from a natural gas feedstream and a means for producing an enhanced heat content fuel gas for use in a natural gas plant.

It was found that the production of a nitrogen-rich vent stream resulted in unique advantages in improving the purity of the by-product gas. In addition it was found that the use of a copurge step combined with a vent step in the PSA process produced unique advantages in energy savings and enhancing by-product value. Furthermore, it was found that the use of a compound bed with at least two selective adsorbents such as activated carbon and silica gel, or activated carbon and alumina provided additional stability such that in the event of process upset, the adsorbent was able to recover rapidly, without residual build-up of heavy hydrocarbons. The preferred adsorbent for the equlibrium selective process is activated carbon.

In one aspect of the present invention, there is provided a pressure swing adsorption process for the reduction of the nitrogen content of a gas feedstream comprising methane and nitrogen. The process comprises the passing of a feedstream cocurrently through a first adsorption zone and contacting the feedstream with an adsorbent material in an adsorbent bed. The adsorbent bed contains both adsorbent material and a void space. The adsorbent material will selectively adsorb methane as the passing of the feedstream is continued until the adsorption zone reaches a first pressure. At this point the passing of the feedstream to the first adsorption zone is discontinued and the first adsorption zone is partially depressured to a second pressure by cocurrently withdrawing a first and a second nitrogen-rich gas stream from the first adsorption zone. At least a portion of one of the nitrogen-rich gas streams is countercurrently passed to a second adsorption zone. At least a portion of one of the nitrogen-rich gas streams is vented from the process. The first adsorption zone is further depressured to a third pressure that is lower than the second pressure by cocurrently withdrawing a high heat content fuel gas stream. The first adsorption zone is then countercurrently depressurized to recover a first product gas stream. The first adsorption zone then undergoes a countercurrent purging with a nitrogen-rich gas stream while countercurrently recovering a second product gas stream from the first adsorption zone. The first adsorption zone then undergoes two countercurrent repressurization steps, the first by passing at least a portion of a third nitrogen-rich gas stream to the first adsorption zone, and the second by passing at least a portion of a fourth nitrogen-rich gas stream to the first adsorption zone.

In another aspect of the present invention, there is provided a pressure swing adsorption process for the reduction of the nitrogen content of a gas feedstream comprising methane and nitrogen. The process comprises the passing of a feedstream cocurrently through a first adsorption zone and contacting the feedstream with an adsorbent material in an adsorbent bed. The adsorbent bed contains both adsorbent material and a void space. The adsorbent material will selectively adsorb methane as the passing of the feedstream is continued until the adsorption zone reaches a first pressure. At this point the passing of the feedstream to the first adsorption zone is discontinued and the passing of at least a portion of a first product stream gas is cocurrently introduced to the first adsorption zone as a copurge stream. The first product stream gas displaces the nitrogen in the void space and raises the pressure of the first adsorption zone to a second pressure. The flow of the first product gas to the first adsorption zone is discontinued and the first adsorption zone is partially depressured to a third pressure by cocurrently withdrawing a first and a second nitrogen-rich gas stream from the first adsorption zone. At least a portion of one of the nitrogen-rich gas streams is countercurrently passed to a second adsorption zone. At least a portion of one of the nitrogen-rich gas streams is vented from the process. The first adsorption zone is further depressured to a fourth pressure that is lower than the third pressure by cocurrently withdrawing a high heat content fuel gas stream. The first adsorption zone is then countercurrently depressurized to recover a second product gas stream. The first adsorption zone then undergoes a countercurrent purging with a nitrogen-rich gas stream while countercurrently recovering a third product gas stream from the first adsorption zone. The first adsorption zone then undergoes two countercurrent repressurization steps, the first by passing at least a portion of a third nitrogen-rich gas stream to the first adsorption zone, and the second by passing at least a portion of a fourth nitrogen-rich gas stream to the first adsorption zone.

In another aspect of the present invention, a pressure swing adsorption process comprising five adsorption zones is employed for the reduction of the nitrogen content of a gas feedstream comprising methane and nitrogen. The process comprises the passing of a feedstream cocurrently to a first adsorption zone to raise the pressure of the adsorption zone to a first pressure. Each adsorption zone contains an adsorbent material and void spaces to selectively adsorb methane. The passing of the feedstream to the first adsorption zone is then discontinued and at least a portion of a first product gas stream is cocurrently passed to the first adsorption zone at a pressure sufficient to displace at least a portion of nitrogen from the void spaces of the adsorption zone thereby raising the first adsorption zone to a second pressure. Simultaneously, a first nitrogen-rich stream is vented from the process. The passing of the first product gas stream to the first adsorption zone is discontinued and the first adsorption zone is partially depressured to a third pressure by cocurrently withdrawing a second nitrogen-rich stream from the first adsorption zone and passing the second nitrogen-rich stream to a third adsorption zone to equalize pressure with the third adsorption zone. A second depressurization of the first adsorption zone then proceeds to a fourth pressure by the cocurrent withdrawal of a third nitrogen-rich stream and the passing of the third nitrogen-rich stream to a fourth adsorption zone. In a third depressurization step, the first adsorption zone is lowered to a fifth pressure by the cocurrent withdrawal of the fourth nitrogen-rich gas stream to a fourth adsorption zone to equalize the pressure between the first adsorption zone and the fourth adsorption zone. The bed then undergoes a depressurization step to a sixth pressure wherein a fifth nitrogen-rich gas stream is cocurrently withdrawn and passed to a fifth adsorption zone. The next step involves a cocurrent recovery of a high heat content fuel gas stream from the first adsorption zone thereby reducing the pressure of the first adsorption zone to a seventh pressure. The first adsorption zone is further depressured to an eighth pressure by the countercurrent recovery of a second product gas stream. The first adsorption zone then undergoes a countercurrent purge step with a sixth nitrogen-rich gas stream from a second adsorption zone and a seventh nitrogen-rich gas stream from the third adsorption zone providing purge gas and recovering a third product gas stream from the process. The first adsorber bed is then countercurrently repressurized in two equalization steps, the first step accomplished with an eighth nitrogen-rich gas stream from the third adsorption zone to a pressure greater than said sixth pressure and the second repressurization step accomplished by a ninth nitrogen-rich gas stream from the fourth adsorption zone a pressure greater than said fifth pressure. Each of these steps are repeated in sequence for each of the five adsorption zones.

In another aspect of the present invention, a pressure swing adsorption process comprising six adsorption zones is used for the reduction of the nitrogen content of a gas feedstream comprising methane and nitrogen. The process comprises the passing of the feedstream cocurrently to a first adsorption zone to pressure the adsorption zone to a first pressure. Each of the adsorption zones contain an adsorbent material and void spaces to selectively adsorb methane. The passing of the feedstream to the first adsorption zone is discontinued and at least a portion of a first product gas stream is passed cocurrently to the first adsorption zone at a pressure sufficient to displace at least a portion of the nitrogen from the void spaces. A first nitrogen-rich stream is simultaneously vented from the process and the pressure of the first adsorption zone is raised to a second pressure. The passing of the first product gas to the first adsorption zone is discontinued and the first adsorption zone is partially depressured to a third pressure by cocurrently withdrawing a second nitrogen-rich stream from the first adsorption zone and passing that second nitrogen-rich stream to a third adsorption zone to partially equalize the pressure with the third adsorption zone. The first adsorption zone is further depressured to a fourth pressure by cocurrently withdrawing at least a portion of a third nitrogen-rich stream and passing that portion to a fifth adsorption zone and passing the remaining portion of the third nitrogen-rich stream to a fourth adsorption zone to partially equalize the pressure with that fourth adsorption zone. The first adsorption zone then undergoes a third depressurization step to a fifth pressure by cocurrently withdrawing a fourth nitrogen-rich stream and passing the fourth nitrogen-rich stream to a fifth adsorption zone to partially equalize the pressure with that fifth adsorption zone. A high heat content fuel gas stream is cocurrently recovered from the first adsorption zone reducing the pressure of the first adsorption zone to a sixth pressure. The first adsorption zone is then countercurrently depressurized to a seventh pressure and at least a portion of a second product gas stream is recovered from the process and a portion of the second product gas stream is passed to a surge tank. The first adsorption zone is then countercurrently purged with a fifth nitrogen-rich gas stream from the third adsorption zone and a third product gas stream is recovered from the process. The first adsorption zone is then countercurrently repressurized three times. The first countercurrent repressurization is accomplished with a sixth nitrogen-rich gas stream from the third adsorption zone to a pressure greater than said sixth pressure. The second countercurrent repressurization of the first adsorption zone is accomplished with a seventh nitrogen-rich gas stream from the fourth adsorption zone to a pressure greater than the fourth pressure and the third countercurrent repressurization is accomplished with an eighth nitrogen-rich stream from the fifth adsorption zone to an eighth pressure. The process continues repeating these steps in sequence for each of the six adsorption zones.

DETAILED DESCRIPTION OF THE INVENTION

The process of the present invention is useful for purifying methane-containing streams. In general, typical feedstreams will contain water up to saturation levels, less than 25 mol. % $C_2$–$C_5$ hydrocarbons, less than 30 mol. % carbon dioxide and less than 2 mol. % $C_6$ and higher hydrocarbons and a number of other impurities such as nitrogen. Natural gas is a common source of such impurity-containing methane, and in natural gas the hydrocarbon impurities are primarily the saturated type such as ethane and propane. Additionally, natural gas can contain other components such as nitrogen, helium and argon, although such other components are not appreciably adsorbed in the process of the present invention. Preferably, the feedstream will contain from about 40 to 97 mol. % methane, from about 3 to 60 mol. % $N_2$, from about 0.1 to 10 mol. % ethane, from about 0.1 to 20 mol. % $C_3+$ hydrocarbons and from about 0.1 to 20 mol. % $CO_2$.

In accordance with the present invention, the adsorption pressure is generally from about 50 to 1000 psia and preferably from about 100 to 200 psia. The desorption pressure is generally from about 1 to 100 psia and preferably from about 14.7 to 25 psia. Suitable operating temperatures are generally within the range of from about 50°–150° F. There can be a variety of cocurrent depressurization steps to intermediate pressures, cocurrent purging steps and countercurrent purging steps, all of which are well known to those skilled in the art and described in the previously cited patents relating to PSA processes. For example, three or more of such cocurrent depressurization steps can be employed for pressure equalization to further improve product recovery such as disclosed in the above-identified U.S. Pat. No. 3,986,849. In addition, the purge step can be performed either prior to, simultaneously with, or subsequently to the regenerating or desorption step.

The process of the present invention will hereinafter be described with reference to the drawings.

Figure 1:
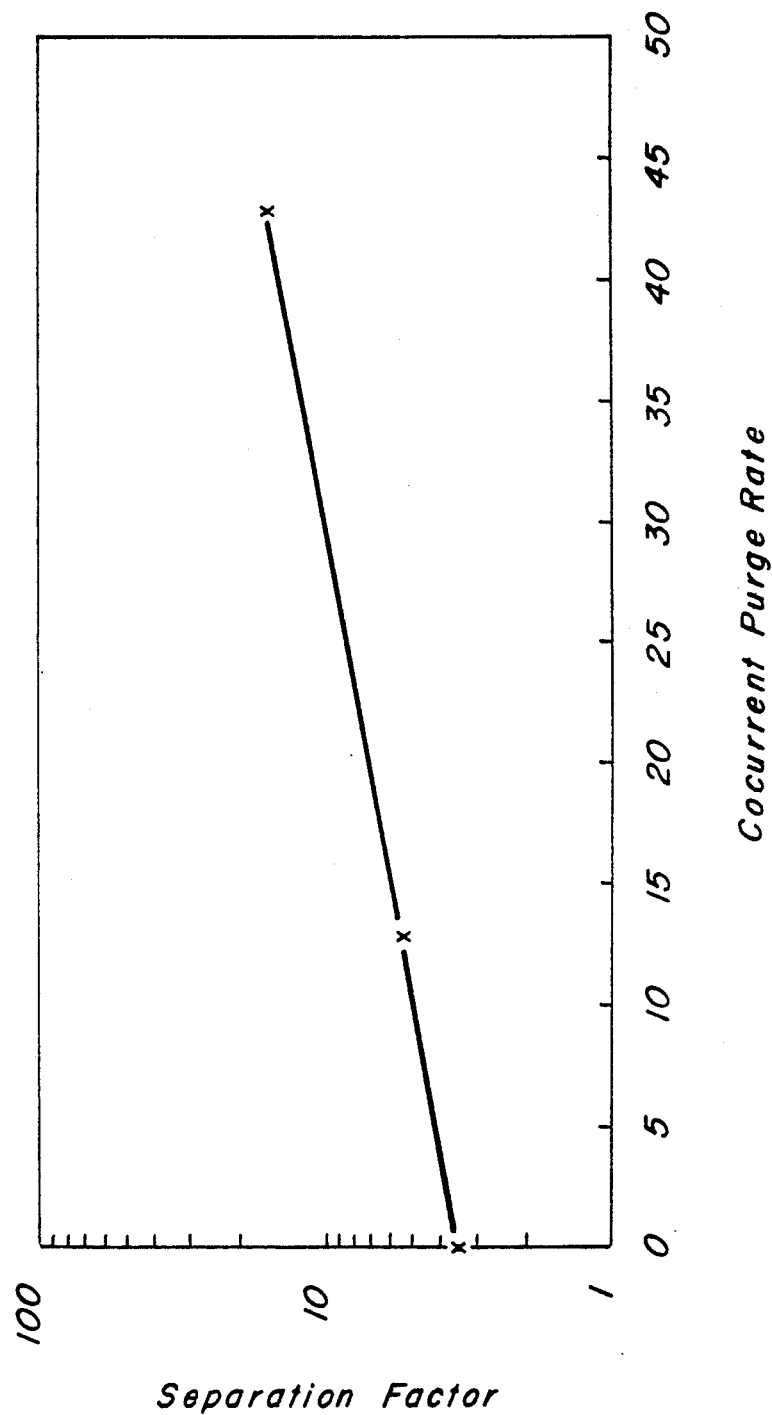
FIG. 1 is a diagram relating the separation factor to the amount of copurge for the separation of methane from nitrogen.

In one arrangement the process of the current invention makes use of a cocurrent purge or copurge step wherein at least a portion of the product gas is recycled to the adsorption zone following the adsorption fill or feed repressurization step to enrich the hydrocarbon in the bed and improve product purity. The copurge rate indicates the amount of product gas recycled in the process. The effect of the copurge rate on the overall operation of the system is shown in FIG. 1. The separation factor is the molar ratio of the methane to nitrogen molar ration in the product divided by the methane to nitrogen molar ratio in the feedstream. Referring to FIG. 1, the effect of the copurge rate on the separation factor is shown for a system recovering 87% methane in the product gas and a feed nitrogen contact of 15%. Without the copurge or recycle step, the separation factor was between 3 and 3.5 indicating a 5% nitrogen content in the product gas. As the copurge rate is increased to between a 40-45% copurge rate, the nitrogen in the product is reduced to about 1.5%.

Figure 2:
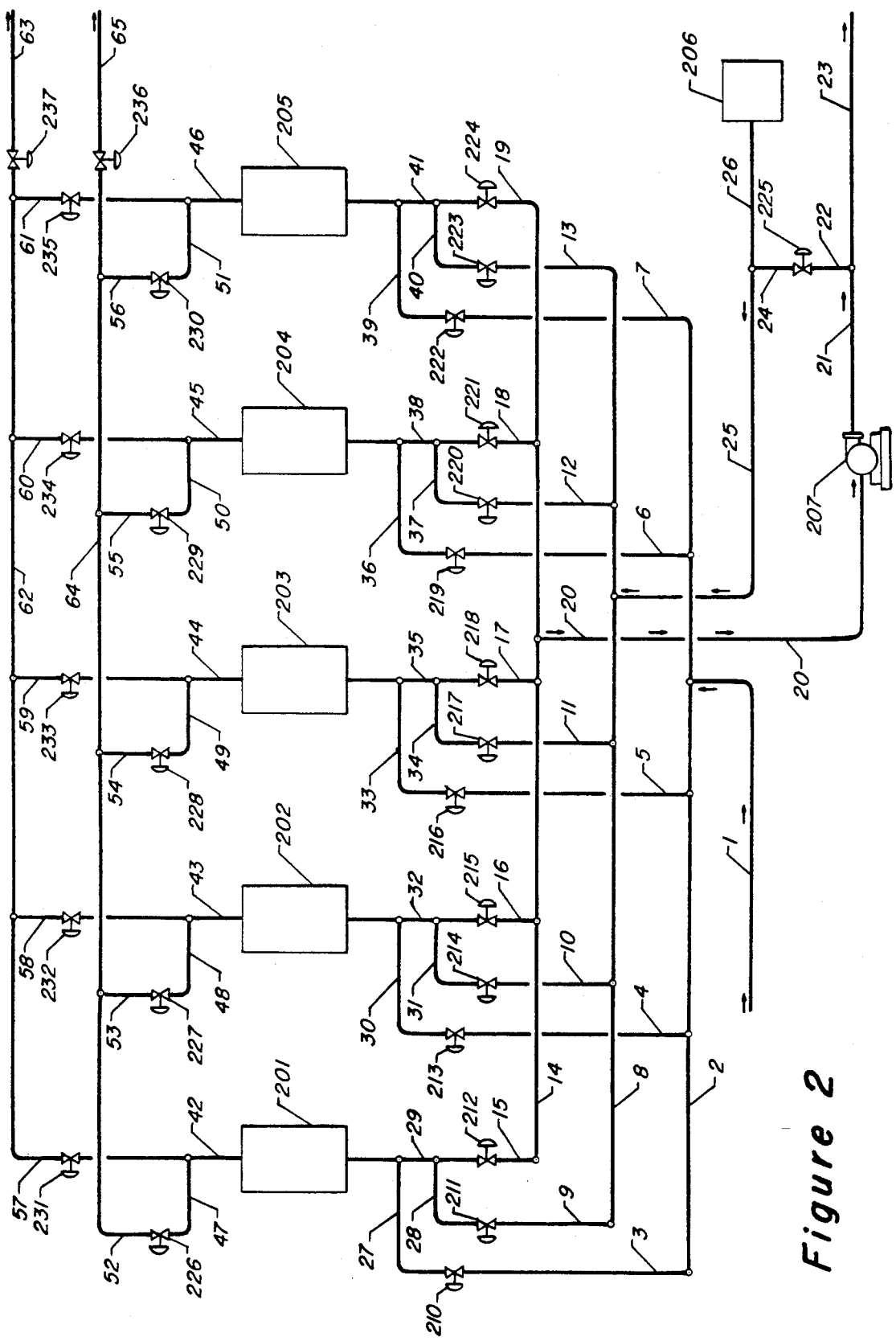
FIG. 2 is a schematic flowsheet of a five-bed PSA system.

FIG. 2 is a schematic flowsheet of a five-adsorption zone PSA system. With reference to FIG. 2, the five-adsorption zones are loaded with an adsorbent for the selective adsorption of methane. The five-adsorption zones are arranged in parallel between feedstream manifold 2 and waste gas manifold 62. Each of the adsorbent zones undergoes a series of 11 or more steps. Beginning with the feed repressurization step in adsorbent zone 201, feed is introduced to the PSA system through line 1 to the feed manifold 2, and through line 3, valve 210, and line 27 and 29 to reach adsorber zone 201. When feed is introduced to adsorber zone 202, feed flows from feed header 2 to line 4, through valve 213, and through line 30 to line 32. Similarly, when feed is introduced to adsorber zone 203, feed flows from feed header 2 to line 5, through valve 216, and through line 33 to line 35. When feed is introduced to adsorber zone 204, feed flows from feed header 2 to line 6, through valve 219, and through line 36 to line 38. When feed is introduced to adsorber zone 205, feed flows from feed header 2 to line 7, through valve 222, and through line 39 to line 41. During this feed repressurization and adsorption, the pressure is increased from a first equalization pressure to the pressure of the feed. The methane in the natural gas is adsorbed into the adsorbent, displacing the nitrogen into the void space in the adsorption zone 201.

At the conclusion of the feed repressurization step, valve 210 is closed. During the copurge step at least a portion of the compressed product gas is taken from storage tank 206 via lines 26 and 25, copurge manifold 8, line 9, valve 211 line 28 and line 29 to adsorber zone 201 enriching the hydrocarbon in the adsorber zone, raising the pressure of the adsorber zone to at least 150 psia, and improving product quality. When adsorber zone 202 is in the copurge mode, the at least a portion of the compressed product gas is taken from copurge manifold 8 via line 10, through valve 217 and line 31 to line 32. Similarly for adsorber zone 203, the compressed product gas is taken from copurge manifold 8 via line 11, through valve 217 and line 34 to line 35. When adsorber zone 204 is in the copurge mode, the compressed product gas is taken from copurge manifold 8 via line 12, through valve 220 and line 37 to line 38. Similarly for adsorber zone 205 in the copurge mode, the compressed product gas is taken from copurge manifold 8 via line 13, through valve 223 and line 40 to line 41. In the cocurrent purge or coupurge step a portion of a nitrogen-rich gas stream in the void spaces of adsorption zone 201 is vented to the atmosphere via lines 42 and 47, valve 226, the vent manifold 64, valve 236 and line 65.

When adsorber zone 202 is in the copurge mode, the nitrogen-rich gas stream is removed via line 48, through valve 227 and line 53 to vent manifold 64. Similarly when adsorber zone 203 is in the copurge mode, the nitrogen-rich gas stream is removed via line 49, through valve 228 and line 54 to vent manifold 64. When adsorber zone 205 is in the copurge mode, the nitrogen-rich gas stream is removed via line 51, through valve 230 and line 56 to vent manifold 64.

A first equalization step is performed by cocurrently depressurizing bed 201 with another adsorber zone 203 in the same mode, wherein the pressure is reduced typically by about 50 psi to less than 100 psia by opening valves 231 and 233 and allowing gas to flow from adsorber zone 201, through lines 42 and 57, waste gas manifold 62 and lines 59 and 44.

A provide purge step continues the depressurization of adsorber zone 201 by about at least 5 psi and typically 10 psi to provide purge gas via lines 42 and 47 to valve 226 and line 52 to vent gas header 64 and on to adsorber zone 204 via line 55, valve 229 and lines 50 and 45.

A second equalization step is performed with another adsorber zone 204, undergoing a similar step. This low pressure equalization reduces the pressure of adsorber zone 201 by about another 35 psi to a pressure in the range of 40-60 psia by passing a largely nitrogen stream through line 42 to valve 231 and line 57 to the waste gas header 62. From the waste gas header 62, the largely nitrogen stream passes to adsorber zone 204 via line 60, valve 234 and line 45.

In another sequence, a similar second equalization step is performed between adsorber zones 202 and 205 by passing a nitrogen stream through line 43 to valve 232 to line 58 and on to waste gas header 62. From waste gas header 62, the nitrogen stream is passed to adsorber zone 205 via line 61, through valve 235 and line 46.

A second provide purge step continues the depressurization of adsorber bed 201 by about another 5 psi by the cocurrent passing of a portion of nitrogen-rich gas from adsorber 201 through lines 42 and 47 to valve 226 and from valve 226 to line 52 and the vent gas header 64 and on to adsorber zone 205.

During a cocurrent dump step, the effluent from adsorber zone 201 passes through line 42, valve 231 and line 57 to reach the waste gas header 62 as a high heat content fuel gas. The high heat content fuel gas leaves the system as a byproduct through valve 237 and line 63. The recovery of the high heat content fuel gas is controlled by controlling valve 237 according to the pressure change, typically 5 to 10 psia during the cocurrent dump step.

In the blowdown step wherein the pressure of adsorber zone 201 is reduced to a pressure typically below 30 psia, a portion of the methane or product gas is desorbed and is countercurrently passed through line 29 to valve 212 to line 15 and to product header 14. Similarly for adsorber zone 202 in the blowdown step, the product gas is passed through line 32, through valve 215 and line 16 to the product header 14. When adsorber zone 203 is in the blowdown step, the product gas is passed through line 35, through valve 218 and line 17 to the product header 14. When adsorber zone 204 is in the blowdown step, the product gas is passed through line 38, through valve 221 and line 18 to the product header 14. When adsorber zone 205 is in the blowdown step, the product gas is passed through line 41, through valve 224 and line 19 to the product header 14. From the product header the product gas passes through line 20 to compressor 207 wherein the pressure is raised to a pressure greater than 150 psia in line 21. A portion of this product gas is passed to the storage tank 206 via line 22, valve 225 and lines 24 and 26.

A purge step is accomplished by taking purge gas from adsorber zones 202 and 203 via the vent manifold 64 through line 52, valve 226 and lines 47 and 42 to adsorber zone 201. The product gas passes through line 29 to valve 212 to line 15 and to the product header 14. From the product header 14, the product gas is passed via line 20 to compressor 207 and through lines 21 and 23.

Following the purge step, adsorber 201 is repressurized. A first countercurrent repressurization step is accomplished by equalizing the pressure between adsorber zone 201 and adsorber zone 203 by opening valves 233 and 231 and allowing the passing of a largely nitrogen containing gas through lines 44 and 59 to waste gas manifold 62 and from line 62 to lines 57 and 42. This step increases the pressure of adsorber 201 to a pressure typically less than 50 psia and pushes the methane front towards the feed end of the adsorber zone 201.

A second countercurrent repressurization step is accomplished by equalizing the pressure between adsorber zone 201 and adsorber zone 204 to partially repressurize adsorber zone 201. Flow leaves adsorber zone 204 via line 45, valve 234 and line 60 to enter the waste gas manifold 62. Valve 231 is opened to allow flow to continue to adsorber zone 201 via lines 57 and 42. At the end of this second repressurization step, adsorber zone 201 has reached a pressure typically less than 100 psia.

Figure 3:
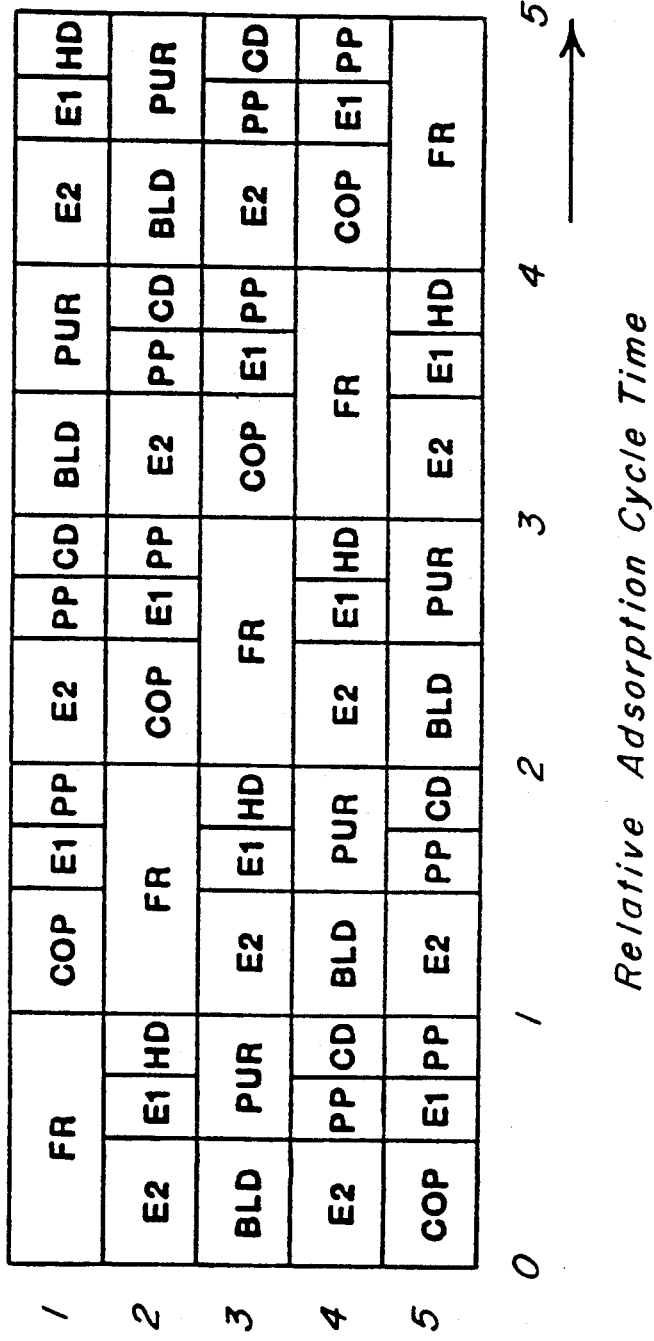
FIG. 3 illustrates the cycle of the five-bed PSA system.

FIG. 3 is a cycle chart for the apparatus of FIG. 2. As shown in the cycle chart, each of the five-adsorption zones in the system undergoes the sequential steps of adsorption during feed repressurization (FR), cocurrent purge (COP), pressure equalization with another zone (E1), providing purge gas to another zone (PP), pressure equalization (E2) cocurrent dump (CD) to release a high heat content fuel gas, countercurrent blowdown (BLD) to produce a portion of the product gas, countercurrent purge (PUR) to produce the remainder of the product gas, and corresponding repressurization steps E2 and E1 that now raise pressure by pressure equalization with other zones.

The five-adsorber zone system of FIG. 3 could have a total cycle time in a range of from 2.5 to 20 minutes and include a hold (HD) to fill in the cycle at the end of the final repressurization step (E1). The adsorption and feed repressurization step (FR) requires 0.5 to 4.0 minutes to complete. The cocurrent purge (COP) step involves the introduction of product gas to the adsorption zone and the simultaneous withdrawal of nitrogen from the effluent end of the zone. A 15 to 120 second period is allowed for the COP operation. This process enriches adsorption zone with the product gas and sharpens the composition profile between the methane and the nitrogen. Furthermore, it is preferred to withdraw nitrogen from the process at this point because it minimizes the pressure losses in the system, and it provides the flexibility in the process to operate the process and to control the heat content of the fuel gas produced by the process. The withdrawal of nitrogen could take place during this step or any of the provide purge or pressure equalization steps. The nitrogen may be vented to the atmosphere if the composition is suitable. In the operation of the system, a feedstream nitrogen content of 8% or less will result in a nitrogen-rich gas stream of 50-60 vol. % nitrogen. A feedstream nitrogen content of 15% or greater will result in a nitrogen-rich gas stream containing greater than 90 vol. % nitrogen. The first equalization step requires 7.5 to 60 seconds. As indicated in FIG. 3, as the first adsorber zone depressurizes in the E1 step, the nitrogen-rich gas released from the first absorber zone is passed to the third adsorber zone for repressurization. At the end of the first equalization step, the first absorber zone is slightly depressured to provide a nitrogen-rich purge gas to the fourth adsorber zone, undergoing a countercurrent purge step of the last half of the countercurrent purge step in the fourth adsorber zone.

The second equalization step (E2) requires 15 to 120 seconds to complete, equalizing pressure between adsorber zones 1 and 4. A second provide purge step provides nitrogen-rich purge gas to adsorber zone 5 for 7.5 to 60 seconds. A cocurrent dump (CD) step, lasting 7.5 to 60 seconds depressures the first adsorption zone and produces the low heat content fuel gas product.

The blowdown (BLD) step takes place over 15 to 120 seconds, desorbing the methane from the adsorbent and producing the product gas. A portion of the product gas is repressurized with a compressor and returned to an adsorber zone in the cocurrent purge step to enrich the adsorber zone. A surge tank to retain a portion of the product gas is provided. The first adsorber zone is countercurrently purged with purge gas from adsorption zone 2 for the first 7.5 to 60 seconds and with purge gas from adsorber zone 3 for the second 7.5 to 60 second segment of the purge step. At the purge step, two pressure equalization steps raise the pressure of the first adsorption zone. The first repressurization step (E2) is performed with the third adsorption zone for a 15 to 120 second period; and, the second repressurization step (E1) is performed with the fourth adsorption zone. A 7.5 to 60 second hold step fills out the remaining portion of the 2.5 to 20 minute cycle.

Figure 4:
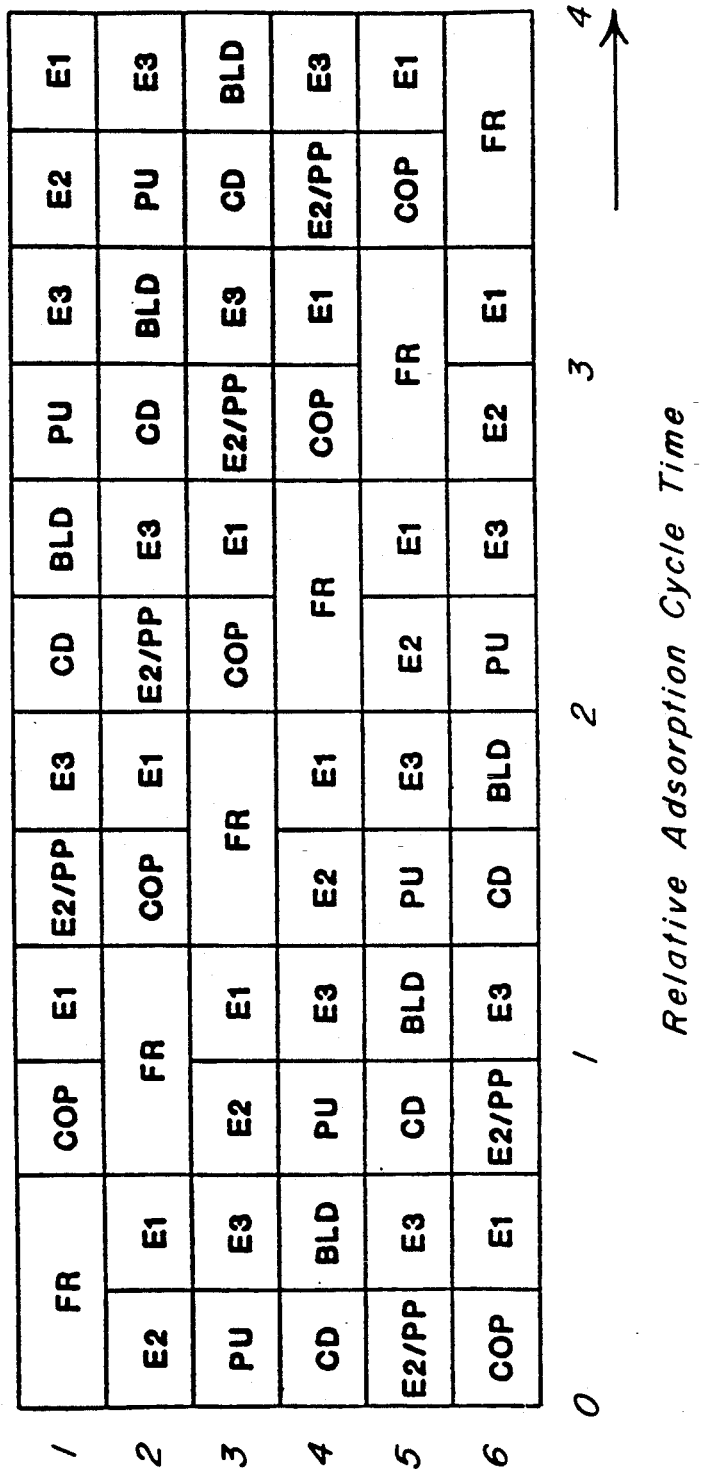
FIG. 4 illustrates the cycle of the six-bed PSA system.

FIG. 4 shows a cycle chart for the selective adsorption process carried out for another embodiment of the present invention. The FIG. 4 cycle chart describes a six-bed system. The cycle chart indicates the addition of one adsorber zone and the use of three partial equalization steps. A provide purge step before the (E2) step has been eliminated. As in the five-zone system, one adsorption zone is always in the adsorption mode, but there is no overlapping of adsorption steps. The total cycle time is 80% of the 5-bed cycle time. During the (E2) step, gas from the adsorption zone undergoing the pressure reduction provides purge gas to another adsorption zone.

The six-adsorption zone provides a 50% feed capacity advantage over the five-adsorption zone system.

Figure 5:
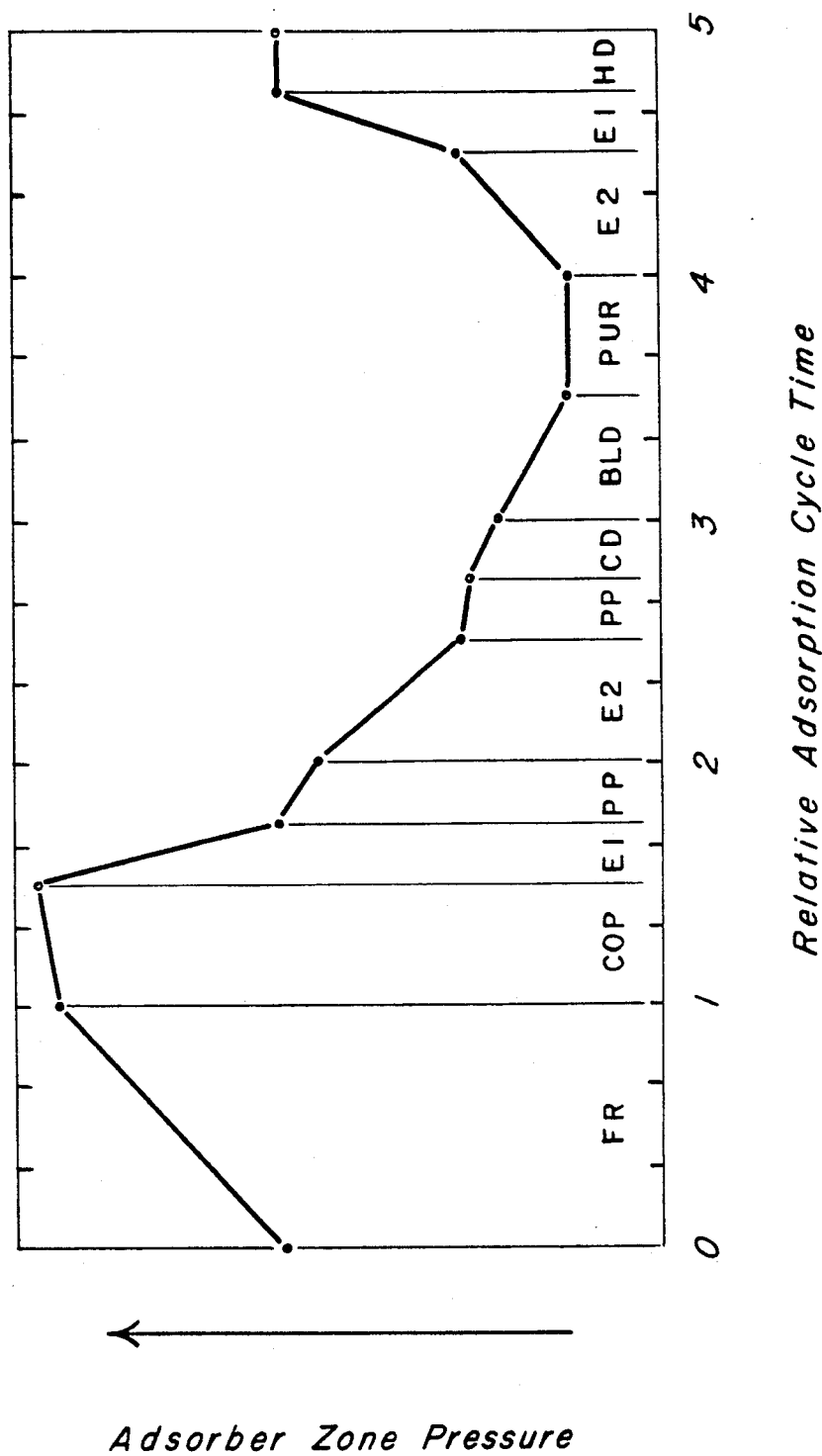
FIG. 5 illustrates a pressure cycle diagram for the five-bed system.
Figure 6:
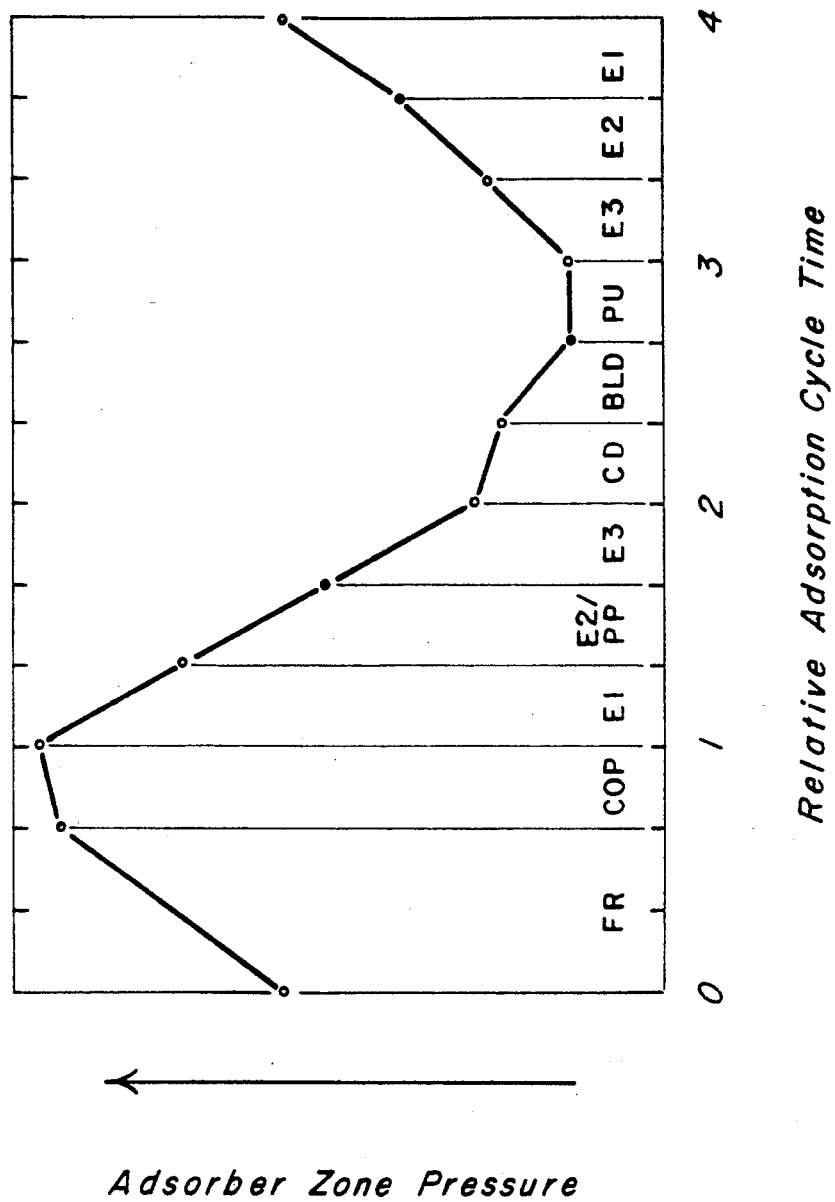
FIG. 6 illustrates a pressure cycle diagram for the six-bed system.

FIGS. 5 and 6 are pressure cycle diagrams for the five-adsorber zone system and the six adsorber-zone system, respectively. In the figures the pressure cycle is representative of the selective adsorption process carried out in accordance with the present invention. The times and pressure indicated in these figures can be correlated with the times indicated for the cycle steps shown in FIGS. 3 and 4.

EXAMPLE I

This example is based on the process for separating nitrogen and methane from a mixture thereof in a five-adsorption zone PSA system. The feedstream tested was the product gas from a natural gas plant with the feed composition shown in Table 1. The nitrogen content of the product gas was approximately 8 vol. %. The objective of this experiment was to reduce the nitrogen content to below 8 vol. %. In this system, no nitrogen-rich vent was taken during the cocurrent purge operation.

The process performance data was obtained using a pilot scale five-bed pressure swing adsorption unit, constructed of stainless steel. Each vessel had a packed volume of 0.24 ft$^3$ and contained approximately 8 lbs of activated carbon adsorbent per vessel. The pilot plant contained the required manifolding to operate the vessels through the cycle steps described in the cycle chart according to FIG. 3. The adsorption step in each bed was 1-minute in duration and the process operated in a continuous manner. In Example I no nitrogen-rich stream was produced during the copurge step.

This example illustrates the worst case scenario wherein the nitrogen content of the feed is relatively low and the by-product fuel gas contains a correspondingly higher volume percentage of methane. The by-product fuel gas heat content was 660 BTU/ft$^3$ and the recovery of the methane was 85% volume. Approximately 20% of the feed gas was recovered as a very low heat content by-product fuel gas which has limited use as a fuel. The useable methane recovery for this example was 85 vol. %.

EXAMPLE II

This example is based on the process of the present invention in the apparatus described in Example I. The feed, product and by-product compositions are shown in Table II. The five-bed PSA system operation included the withdrawing of a nitrogen-rich vent stream at the end of the feed repressurization step. A copurge step was not required to meet product specification in this case. The heat content of the by-product fuel stream increased to 809 BTU/ft$^3$, a 22.6% increase over the case shown in Example I. Furthermore, the overall recovery of methane in useable product gas or in a useable fuel by-product increased to 98% volume. The results of this example shows that the process of this invention can create a more useful by-product fuel stream which can be used, for example, in the natural gas plant to meet fuel requirements for rotating equipment such as pumps and compressors. In addition, the data directionally confirm to one skilled in the art that the improvement in the quality of the by-product fuel gas for higher concentrations of nitrogen in the feedstream and the potential for venting the nitrogen-rich stream to the atmosphere for higher amounts of nitrogen in the feedstream. Furthermore, this pilot system demonstrated a stable operation which was able to reduce the nitrogen content of the feedstream to meet pipeline specification.

EXAMPLE III

This example is based on the process of the instant invention, as described in Examples I and II, and illustrates the flexibility of the system for controlling the operation to produce a higher heat content by-product fuel stream. The results of these data are shown in Table III. By increasing the amount of the nitrogen-rich gas vent, the heat content of the by-product stream increased without substantially degrading the performance of the system to produce a low nitrogen product gas meeting pipeline specification.

EXAMPLE IV

This example is based on the process of the instant invention as described in Example I and II for a feed gas containing 30% nitrogen and 70% methane. Tests were run with this higher nitrogen content feed with and without a nitrogen-rich vent stream following the feed repressurization step. The results of this test are shown in Table V. The data for the test without the nitrogen-rich vent is shown as Part A and the data for the test with the nitrogen-rich vent is shown as Part B. The most significant result was the improvement in overall methane recovery in Part B to 97%. In addition, the heating value of the by-product gas improved from the marginal value of 298 BTU/ft$^3$ in Part A to the more reasonable value of 486 BTU/ft$^3$ in Part B. The vent gas nitrogen concentration for Part B was 87.5%. The product gas comprised 89% methane and 11% nitrogen for this operation without the copurge step.

EXAMPLE V

This example is based on the process of the instant invention shown in Examples I and II and the feedstock composition of Example IV Part B. In addition, a copurge step has been added to the process sequence. Table V shows the results of this evaluation. The addition of the copurge step reduced the concentration of nitrogen in the product gas to 3.6%. In this scheme, the copurge rate was 17%. The overall methane recovery was 96.7% and the vent stream was 87% nitrogen. This example clearly demonstrated the ability of the instant process to produce a low nitrogen, pipeline-quality product gas, a high heat content by product gas and a very low heat content vent stream while maintaining a high overall methane recovery.

EXAMPLE VI

Figure 7:
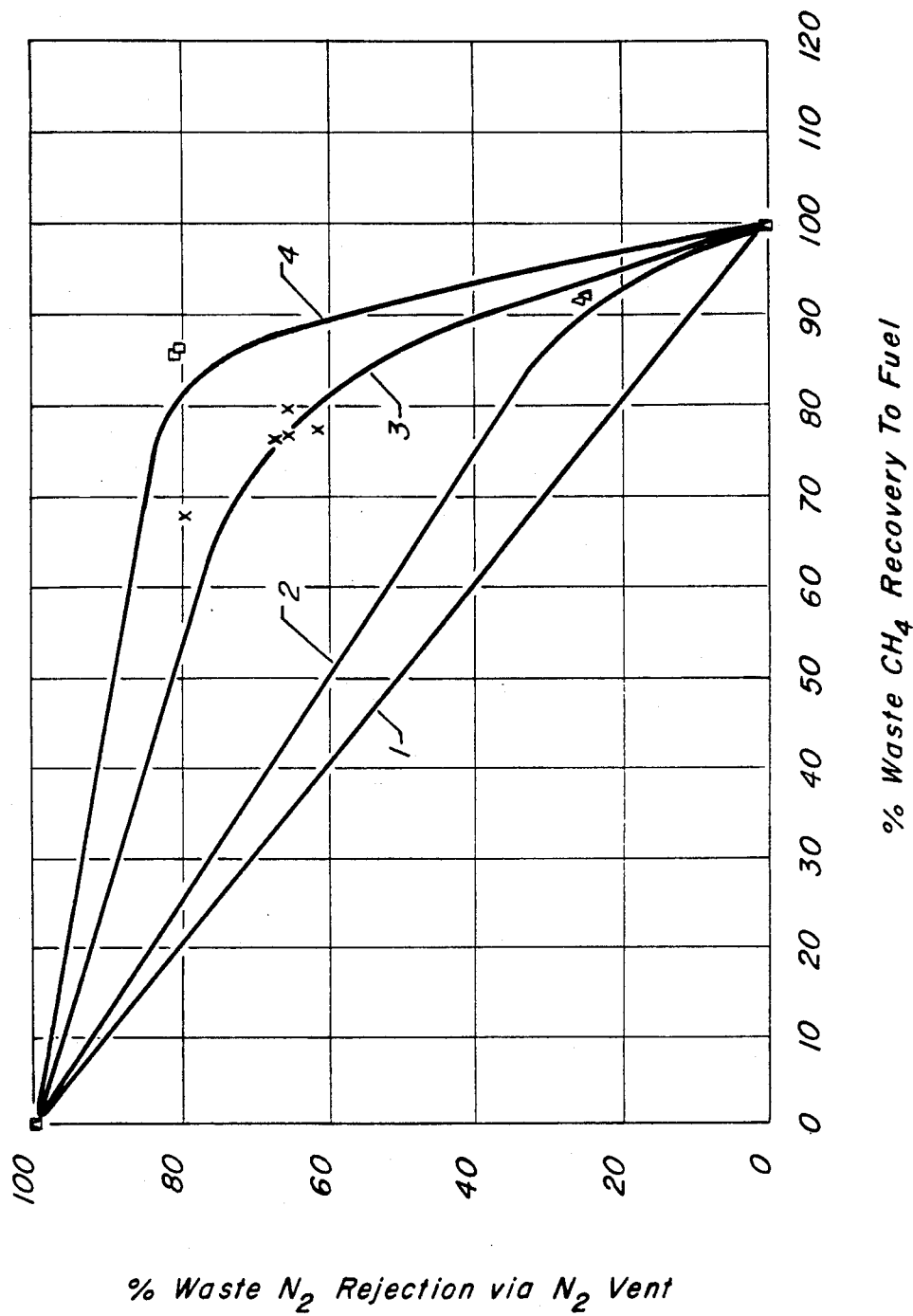
FIG. 7 is a diagram relating the percentage nitrogen rejected in the vent stream to the percentage recovery of methane as fuel.

FIG. 7 illustrates the effect on operation of the 5-bed system for various schemes for enriching the product composition by withdrawing a portion of the waste stream as a nitrogen-rich vent. FIG. 7 is a plot of the percent of the waste nitrogen which is directed to the vent stream versus the percent of the waste methane directed to the fuel stream. The curve 1 is the distribution between vent and fuel, if a constant composition waste stream was volumetrically divided between vent and fuel. Curve 1 represents a compositional line showing no appreciable nitrogen enrichment of the vent stream for the simple splitting of the waste stream. Curves 2, 3 and 4 demonstrate the experimental effects of removing the vent stream at different points in the cycle. Since the curves are above the diagonal, more of the waste nitrogen is concentrated to the vent stream at the same recovery of methane to the fuel stream. This results in a nitrogen enriched vent stream and methane enriched fuel stream relative to the pressure swing adsorption process waste stream.

Curve 2 represents the splitting of the waste stream during the cocurrent dump step. The variation in the gas composition during the cocurrent dump step resulted in a slight enrichment of the nitrogen-rich vent over the waste stream composition.

Curve 3 shows the effect of feed repressurization while withdrawing a nitrogen-rich vent stream. This operation represented the most economical operation of the 5-bed scheme for enriching the nitrogen-rich vent stream.

Curve 4 represents a variation in the cycle wherein the light gas withdrawn from the top of another adsorber bed during an adsorption step is used to repressurize the adsorber following the last equalization step. This operation yielded the greatest enrichment of the nitrogen-rich gas, but also represented a highest operating cost scheme.

TABLE I

EXAMPLE I: Base Case

| | Feed | Product Gas | By-Product Gas | Vent |
|---|---|---|---|---|
| Component. Vol-%: | | | | |
| Methane | 88.4 | 93.4 | 65.6 | |
| Nitrogen | 8.2 | 2.8 | 34.4 | |
| Ethane | 2.9 | 3.2 | 0.03 | |
| Heating Value, BTU/ft$^3$ | 948 | 1002 | 660 | |
| Methane Recovery, % | | 85 | | |
| Overall Methane Recovery, % | | 85 | | |

TABLE II

EXAMPLE II: N$_2$ Vent

| | Feed | Product Gas | By-Product Gas | Vent |
|---|---|---|---|---|
| Component. Vol-%: | | | | |
| Methane | 88.4 | 93.7 | 80.4 | 36.9 |
| Nitrogen | 8.2 | 2.81 | 19.6 | 63.1 |
| Ethane | 2.9 | 2.94 | 0.04 | 0.03 |
| Heating Value. BTU/ft$^3$ | 948 | 1000 | 809 | 372 |
| Methane Recovery, % | | 85 | | |
| Overall Methane Recovery, % | | 98 | | |

TABLE III

Example II: N$_2$ Vent @ 40%

| | Feed | Product Gas | By-Product Gas | Vent |
|---|---|---|---|---|
| Component. Vol-%: | | | | |
| Methane | 88.4 | 93.0 | 87.6 | 47.5 |
| Nitrogen | 8.2 | 2.85 | 12.3 | 52.5 |
| Ethane | 2.9 | 3.60 | 0.08 | 0.05 |
| Heating Value. BTU/ft$^3$ | 945 | 1000 | 883 | 479 |
| Methane Recovery, % | | 85 | | |
| Overall Methane Recovery, % | | 95 | | |

TABLE IV

| | Feed | Product Gas | By-Product Gas | Vent |
|---|---|---|---|---|
| Part A: No Nitrogen Vent | | | | |
| Component. Vol-%: | | | | |
| Methane | 70% | 89% | 29.6 | |
| Nitrogen | 30% | 11% | 70 | |
| Heating Value. BTU/ft$^3$ | 704 | 895 | 298 | |
| Methane Recovery. % | | 86.5 | | |
| Overall Methane Recovery, % | | 86.5 | | |
| Part B: With Nitrogen Vent | | | | |
| Component. Vol-%: | | | | |
| Methane | 70% | 89% | 48.3% | 12.5% |
| Nitrogen | 30% | 11% | 51.6% | 87.5 |
| Heating Value. BTU/ft$^3$ | 704 | 895 | 486 | 126 |
| Methane Recovery, % | | 86.5 | | |
| Overall Methane Recovery, % | | 97.0 | | |

TABLE V

With Nitrogen Vent and Copurge Step

| | Feed | Product Gas | By-Product Gas | Vent |
|---|---|---|---|---|
| Component. Vol-%: | | | | |
| Methane | 70% | 96.4 | 43 | 13 |
| Nitrogen | 30% | 3.6% | 57 | 87 |
| Heating Value, BTU/ft$^3$ | 704 | 970 | 433 | 130 |
| Methane Recovery, % | | 85 | | |
| Overall Methane Recovery, % | | 96.7 | | |
| Recovery, % | | | | |

What is claimed is:

1. A pressure swing adsorption process for the reduction of the nitrogen content of a gas feedstream comprising methane and nitrogen said process comprising:
    (a) passing said feedstream cocurrently through a first adsorption zone and contacting said feedstream with an adsorbent material in an adsorbent bed comprising said adsorbent material and void space to selectively adsorb methane on the adsorbent material and pressure the adsorption zone to a first pressure;
    (b) discontinuing the passing of the feedstream to the first adsorption zone and partially depressurizing the adsorption zone to a second pressure by cocurrently withdrawing a first and a second nitrogen-rich gas stream from said first adsorption zone;
    (c) countercurrently passing at least a portion of one of said nitrogen-rich gas streams to a second adsorption zone;
    (d) venting at least a portion of one of said nitrogen-rich gas streams from the process;
    (e) depressurizing said first adsorption zone to a third pressure that is lower than said second pressure by cocurrently withdrawing a high heat content fuel gas stream;
    (f) countercurrently depressurizing the first adsorption zone and countercurrently recovering a first product gas stream from said first adsorption zone;
    (g) countercurrently purging the first adsorption zone with a nitrogen-rich gas stream and countercurrently recovering a second product gas stream from said first adsorption zone;
    (h) countercurrently repressurizing the adsorption zone by passing at least a portion of a third nitrogen-rich gas stream to said first adsorption zone; and
    (i) countercurrently repressurizing the adsorption zone by passing at least a portion of a fourth nitrogen-rich stream to said first adsorption zone.

2. A pressure swing adsorption process for the reduction of the nitrogen content of a gas feedstream comprising methane and nitrogen said process comprising:
    (a) passing said feedstream cocurrently through a first adsorption zone and contacting said feedstream with an adsorbent material in an adsorbent bed comprising said absorbent material and void space to selectively adsorb methane on the adsorbent material and pressure the adsorption zone to a first pressure;
    (b) discontinuing the passing of the feedstream to the first adsorption zone and cocurrently passing at least a portion of a first product stream gas into said first adsorption zone to displace the nitrogen from the void space and to raise the pressure of said first adsorption zone to a second pressure;
    (c) discontinuing the passing of the first product gas to said first adsorption zone and partially depressurizing the adsorption zone to a third pressure by cocurrently withdrawing a first and a second nitrogen-rich gas stream from said first adsorption zone;

(d) countercurrently passing at least a portion of one of said nitrogen-rich gas streams to a second adsorption zone;

(e) venting at least a portion of one of said nitrogen-rich gas streams from the process;

(f) depressurizing said first adsorption zone to a fourth pressure that is lower than said third pressure by cocurrently withdrawing a high heat content fuel gas stream;

(g) countercurrently depressurizing the first adsorption zone to a desorption pressure and countercurrently recovering a second product gas stream from said first adsorption zone;

(h) countercurrently purging the first adsorption zone with a nitrogen-rich gas stream and countercurrently recovering a third product gas stream from said first adsorption zone;

(i) countercurrently repressurizing the first adsorption zone by passing at least a portion of a third nitrogen-rich gas streams to said first adsorption zone; and (j) countercurrently repressurizing the first adsorption zone by passing at least a portion of a fourth nitrogen-rich stream to said first adsorption zone.

3. The process of claim 2 wherein said process comprises a system of at least five adsorption zones and steps (a) through (j) are repeated in sequence for each adsorption zone.

4. The process of claim 2 wherein said process comprises a system of six adsorption zones and steps (a) through (j) are repeated in sequence for each adsorption zone.

5. The process of claim 2 wherein the feedstream additionally comprises at least one component selected from the group consisting of $C_3+$ hydrocarbons, $C_2$, $CO_2$, and mixtures thereof.

6. The process of claim 2 wherein the feedstream comprises from about 40 to 97 mol. % methane, from about 3 to 60 mol. % $N_2$, from about 0.1 to 10 mol. % ethane, from about 0.1 to 20 mol. % $C_3+$ hydrocarbons, and from about 0.1 to 20 mol. % $CO_2$.

7. The process of claim 2 wherein said adsorbent comprises activated carbon or mixtures of activated carbon and silica gel or activated alumina.

8. The process of claim 2 wherein the first pressure is from about 100 to 200 psia.

9. The process of claim 2 wherein the desorption pressure is from about 14.7 to 25 psia.

10. The process of claim 2 wherein the portion of product gas used to displace the nitrogen in step (b) ranges from 0.1 to 50 volume percent.

11. A pressure swing adsorption process comprising five-adsorption zones for the reduction of the nitrogen content of a gas feedstream comprising methane and nitrogen said process comprising:

(a) passing said feedstream cocurrently to a first adsorption zone containing an adsorbent material and void spaces to selectively adsorb methane and pressure the adsorption zone to a first pressure;

(b) discontinuing the passing of the feedstream to the first adsorption zone and cocurrently passing at least a portion of a first product gas stream to the first adsorption zone at a pressure sufficient to displace at least a portion of nitrogen from the void spaces and simultaneously venting a first nitrogen-rich stream from the process, thereby raising the pressure of said first adsorption zone to a second pressure;

(c) discontinuing the passing of said first product gas stream to said first adsorption zone and partially depressurizing the first adsorption zone to a third pressure by cocurrently withdrawing a second nitrogen-rich stream from said first adsorption zone and passing said second nitrogen-rich stream to a third adsorption zone to equalize pressure with said third adsorption zone;

(d) depressurizing the first adsorption zone to a fourth pressure by cocurrently withdrawing a third nitrogen-rich stream and passing said third nitrogen-rich stream to a fourth adsorption zone;

(e) depressurizing the first adsorption zone to a fifth pressure by cocurrently withdrawing a fourth nitrogen-rich gas stream to the fourth adsorption zone to equalize the pressure with said fourth adsorption zone;

(f) depressurizing the first adsorption zone to a sixth pressure by cocurrently withdrawing a fifth nitrogen-rich gas stream and passing said fifth nitrogen-rich stream to a fifth adsorption zone;

(g) cocurrently recovering a high heat content fuel gas stream from the first adsorption zone and reducing the pressure of the first adsorption zone to a seventh pressure;

(h) depressurizing the first adsorption zone to an eighth pressure by countercurrently recovering a second product gas stream;

(i) countercurrently purging the first adsorption zone with a sixth nitrogen-rich gas stream from a second adsorption zone and a seventh nitrogen-rich gas stream from the third adsorption zone and recovering a third product gas stream from the process;

(j) countercurrently repressurizing the first adsorption zone with an eighth nitrogen-rich gas stream from the third adsorption zone to a pressure greater than said sixth pressure;

(k) countercurrently repressurizing the first adsorption zone with a ninth nitrogen-rich gas stream from the fourth adsorption zone to a pressure greater than said fifth pressure; and (l) repeating steps (a) through (k) in sequence for each of the five-adsorption zones.

12. The process of claim 11 wherein the feedstream additionally comprises at least one component selected from the group consisting of $C_3+$ hydrocarbons, $C_2$, $CO_2$, and mixtures thereof.

13. The process of claim 11 wherein the feedstream comprises from about 40 to 97 mol. % methane, from about 3 to 60 mol. % $N_2$, from about 0.1 to 10 mol. % ethane, from about 0.1 to 20 mol. % $C_3+$ hydrocarbons, and from about 0.1 to 20 mol. % $CO_2$.

14. The process of claim 11 wherein the adsorbent material comprises activated carbon and mixtures thereof with silica gel and/or activated alumina.

15. The process of claim 11 wherein the first pressure is from about 100 to 200 psia.

16. The process of claim 11 wherein the eighth pressure is from about 14.7 to 25 psia.

17. The process of claim 11 wherein the portion of product gas used to displace the nitrogen in step (b) ranges from 0.1 to 50 volume percent.

18. A pressure swing adsorption process comprising six-adsorption zones for the reduction of the nitrogen content of a gas feedstream comprising methane and nitrogen said process comprising:

(a) passing said feedstream cocurrently to a first adsorption zone containing an adsorbent material and void spaces to selectively adsorb methane and pressure the adsorption zone to a first pressure;

(b) discontinuing the passing of the feedstream to the first adsorption zone and cocurrently passing at least a portion of a first product gas stream to the first adsorption zone at a pressure sufficient to displace at least a portion of nitrogen from the void spaces and simultaneously venting a first nitrogen-rich stream from the process, thereby raising the pressure of said first adsorption zone to a second pressure;

(c) discontinuing the passing of said first product gas stream to said first adsorption zone and partially depressurizing the first adsorption zone to a third pressure by cocurrently withdrawing a second nitrogen-rich stream from said first adsorption zone and passing said second nitrogen-rich stream to a third adsorption zone to partially equalize pressure with said third adsorption zone;

(d) depressurizing the first adsorption zone to a fourth pressure by cocurrently withdrawing at least a portion of a third nitrogen-rich stream and passing said portion to a fifth adsorption zone, and passing the remaining portion of said third nitrogen-rich stream to a fourth adsorption zone to partially equalize the pressure with said fourth adsorption zone;

(e) depressurzing the first adsorption zone to a fifth pressure by cocurrently withdrawing a fourth nitrogen-rich stream and passing said fourth nitrogen-rich stream to a fifth adsorption zone to partially equalize the pressure with said fifth adsorption zone;

(f) cocurrently recovering a high heat content fuel gas stream from the first adsorption zone and reducing the pressure of the first adsorption zone to a sixth pressure;

(g) countercurrently depressurizing the first adsorption zone to a seventh pressure and recovering at least a portion of a second product gas stream from the process and passing a portion of said second product gas stream to a surge tank;

(h) countercurrently purging the first adsorption zone with a fifth nitrogen-rich gas stream from the third adsorption zone and recovering a third product gas stream from the process;

(i) countercurrently repressurizing the first adsorption zone with a sixth nitrogen-rich gas stream from the third adsorption zone to a pressure greater than said sixth pressure;

(j) countercurrently repressurizing the first adsorption zone with a seventh nitrogen-rich gas stream from the fourth adsorption zone to a pressure greater than said fourth pressure;

(k) countercurrently repressurizing the first adsorption zone with an eighth nitrogen-rich stream from the fifth adsorption zone to an eighth pressure; and (1) repeating steps (a) through (k) in sequence for each of the six-adsorption zones.

19. The process of claim 18 wherein the feedstream additionally comprises at least one component selected from the group consisting of $C_3+$hydrocarbons, $C_2$, $CO_2$, and mixtures thereof.

20. The process of claim 18 wherein the feedstream comprises from about 40 to 97 mol. % methane, from about 3 to 60 mol. % $N_2$, from about 0.1 to 10 mol. % ethane, from about 0.1 to 20 mol. % $C_3+$hydrocarbons, and from about 0.1 to 20 mol. % $CO_2$.

21. The process of claim 18 wherein the adsorbent material comprises activated carbon and mixtures thereof with silica gel and/or activated alumina.

22. The process of claim 18 wherein the first pressure is from about 100 to 200 psia.

23. The process of claim 18 wherein the seventh pressure is from about 14.7 to 25 psia.

24. The process of claim 18 wherein the portion of product gas used to displace the nitrogen in step (b) ranges from 0.1 to 50 volume percent.

* * * * *